(12) United States Patent  
Schoen et al.

(10) Patent No.: US 9,129,311 B2
(45) Date of Patent: *Sep. 8, 2015

(54) SOCIAL NETWORKING SYSTEM DATA EXCHANGE

(71) Applicant: Facebook, Inc., Menlo Park, CA (US)

(72) Inventors: Kent Schoen, San Francisco, CA (US); Gokul Rajaram, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/569,565

(22) Filed: Dec. 12, 2014

(65) Prior Publication Data

US 2015/0100431 A1   Apr. 9, 2015

Related U.S. Application Data

(63) Continuation of application No. 14/328,981, filed on Jul. 11, 2014, now Pat. No. 8,938,503, which is a continuation of application No. 13/161,415, filed on Jun. 15, 2011, now Pat. No. 8,812,591.

(51) Int. Cl.
*G06F 15/16* (2006.01)
*G06Q 30/02* (2012.01)
*G06Q 50/00* (2012.01)
*H04L 12/58* (2006.01)
*H04L 29/06* (2006.01)

(52) U.S. Cl.
CPC ........ *G06Q 30/0269* (2013.01); *G06Q 30/0254* (2013.01); *G06Q 50/01* (2013.01); *H04L 51/10* (2013.01); *H04L 65/403* (2013.01)

(58) Field of Classification Search
CPC .............................. H04L 51/10; H04L 65/403
USPC .................................................... 709/204, 205
See application file for complete search history.

(56) References Cited

U.S. PATENT DOCUMENTS

| | | | |
|---|---|---|---|
| 7,539,697 | B1 | 5/2009 | Akella et al. |
| 2002/0023230 | A1 | 2/2002 | Bolnick et al. |
| 2008/0086741 | A1 | 4/2008 | Feldman et al. |
| 2008/0172243 | A1 | 7/2008 | Kelly |

(Continued)

OTHER PUBLICATIONS

European Patent Office, Search Report and Opinion, European Patent Application No. 12800724.2, Feb. 6, 2015, seven pages.

(Continued)

*Primary Examiner* — Adnan Mirza
(74) *Attorney, Agent, or Firm* — Fenwick & West LLP

(57) ABSTRACT

An online publisher provides content items such as advertisements to users. To enable publishers to provide content items to users who meet targeting criteria of the content items, an exchange server aggregates data about the users. The exchange server receives user data from two or more sources, including a social networking system and one or more other service providers. To protect the user's privacy, the social networking system and the service providers may provide the user data to the exchange server without identifying the user. The exchange server tracks each unique user of the social networking system and the service providers using a common identifier, enabling the exchange server to aggregate the users' data. The exchange server then applies the aggregated user data to select content items for the users, either directly or via a publisher.

22 Claims, 3 Drawing Sheets

(56) References Cited

U.S. PATENT DOCUMENTS

| | | |
|---|---|---|
| 2008/0208973 A1 | 8/2008 | Hayashi et al. |
| 2009/0319436 A1 | 12/2009 | Andra et al. |
| 2010/0306048 A1 | 12/2010 | Corduneanu et al. |
| 2010/0312649 A1 | 12/2010 | Lurie |
| 2011/0060905 A1 | 3/2011 | Stack et al. |
| 2012/0011006 A1 | 1/2012 | Schultz et al. |

OTHER PUBLICATIONS

Haddadi, H., et al., "MobiAd: Private and Scalable Mobile Advertising," 2010, pp. 1-6, can be retrieved at, <http://haddadi.ir/pubs/mobiad2k10.pdf>.

PCT International Search Report and Written Opinion, PCT Application No. PCT/US2012/040961, Aug. 24, 2012, fifteen pages.

Canadian Intellectual Property Office, Office Action, Canadian Patent Application No. 2,839,375, May 8, 2015, four pages.

SOCIAL NETWORKING SYSTEM DATA EXCHANGE

CROSS REFERENCE TO RELATED APPLICATIONS

This application is a continuation of co-pending U.S. application Ser. No. 14/328,981, filed Jul. 11, 2014, now allowed, which is a continuation of U.S. application Ser. No. 13/161,415, filed Jun. 15, 2011, now U.S. Pat. No. 8,812,591 issued Aug. 19, 2014, which are incorporated by reference in their entirety.

BACKGROUND

This invention generally relates to advertising and more particularly to layering social networking system data on user data to target content item to users.

Advertisers generally want to display online advertisements to users who are likely interested in an advertised product. Often, in order to ascertain whether a user is likely interested in a product, advertisers assume that users exhibiting certain characteristics are also generally interested in certain products. For example, an advertiser may assume that a user who has viewed running videos, has purchased running shoes recently, and has joined a running group may be interested in purchasing a heart rate monitor. However, such information about a user may not available to any advertiser or publisher.

In one example, an advertiser can receive information about a user's purchasing history from a retailer and display advertisements based on the user's purchasing history. For example, an advertiser may display an advertisement for heart rate monitors to a user if the user has purchased running shoes recently. However, the user may not be interested in purchasing a heart rate monitor if the user purchased the running shoes for casual wear. Thus, advertisers are not able to effectively advertise products to users based on a user's purchasing history with a retailer.

In another example, a heart rate monitor may be advertised to a social networking system user who has indicated running as an interest within the social networking system. However, the user may not be running actively or may already have purchased a heart rate monitor. Thus, advertisers routinely advertise products to users who may not be interested in an advertised product.

SUMMARY

Embodiments of the invention enable publishers to provide content items to a user that meets the content item's targeting criteria. Publishers often do not have information about a user to determine whether the user meets the content item's targeting criteria. Thus, in one instance, the publisher requests an exchange server to match users to content items based on the content item's targeting criteria and user data.

In one embodiment, the exchange server receives user data from two or more sources, including a social networking system and a service provider. A service provider may be any entity that provides retail, video, image, data, news content items, or service to the user. For each user, the exchange server aggregates user data such that user information from a social networking system is associated with user data from a service provider. In one embodiment, the exchange server aggregates user data for each user without knowing the user's identity. For example, social networking systems and service providers may want to protect their users' privacy and may not provide any information that may identify the user or violate terms of agreement with the users. In such an instance, the exchange server aggregates user data for each user without knowing user identification information about the user from the service providers or the social networking system.

The exchange server may match users to advertisements by matching content items' targeting criteria to the aggregated data about a user. For example, if a content item's targeting criteria provide that a user must belong to a social networking system, have purchased a product in the last month and is currently attending an educational institution, the exchange server reviews aggregated data, including data from a retailer and a social networking system to determine if the user meets the content item's targeting criteria. The exchange server may select content item to display to a user if the user meets the content item's one or more targeting criteria.

In some instances, a user may meet more than one content item's targeting criteria. In such an instance, the exchange server may rank content items to display to the user based on the number of targeting criteria met. In other instances, the exchange server may also rank content items based on the predicted likelihood that the user will click on the content item, visit a web page or an application associated with the content item, purchase a product displayed in the content item or revenue expected to be generated from displaying the content item to the user. As such, the exchange server may select a content item based on one or more criteria described herein.

The exchange server may provide the selected content item to a publisher, such that the publisher may display the content item to a user. For example, the publisher may display the content item to a user within a web page displayed to the user or within an application executing on the user's computing device. In other instances, the exchange server may provide the ranking associated with the content item, such that the publisher may determine which content item to display to a user. As such the publisher may choose to display some lower ranked content items in order to provide a customized experience to a user.

The features and advantages described in this summary and the following detailed description are not all-inclusive. Many additional features and advantages will be apparent to one of ordinary skill in the art in view of the drawings, specification, and claims thereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
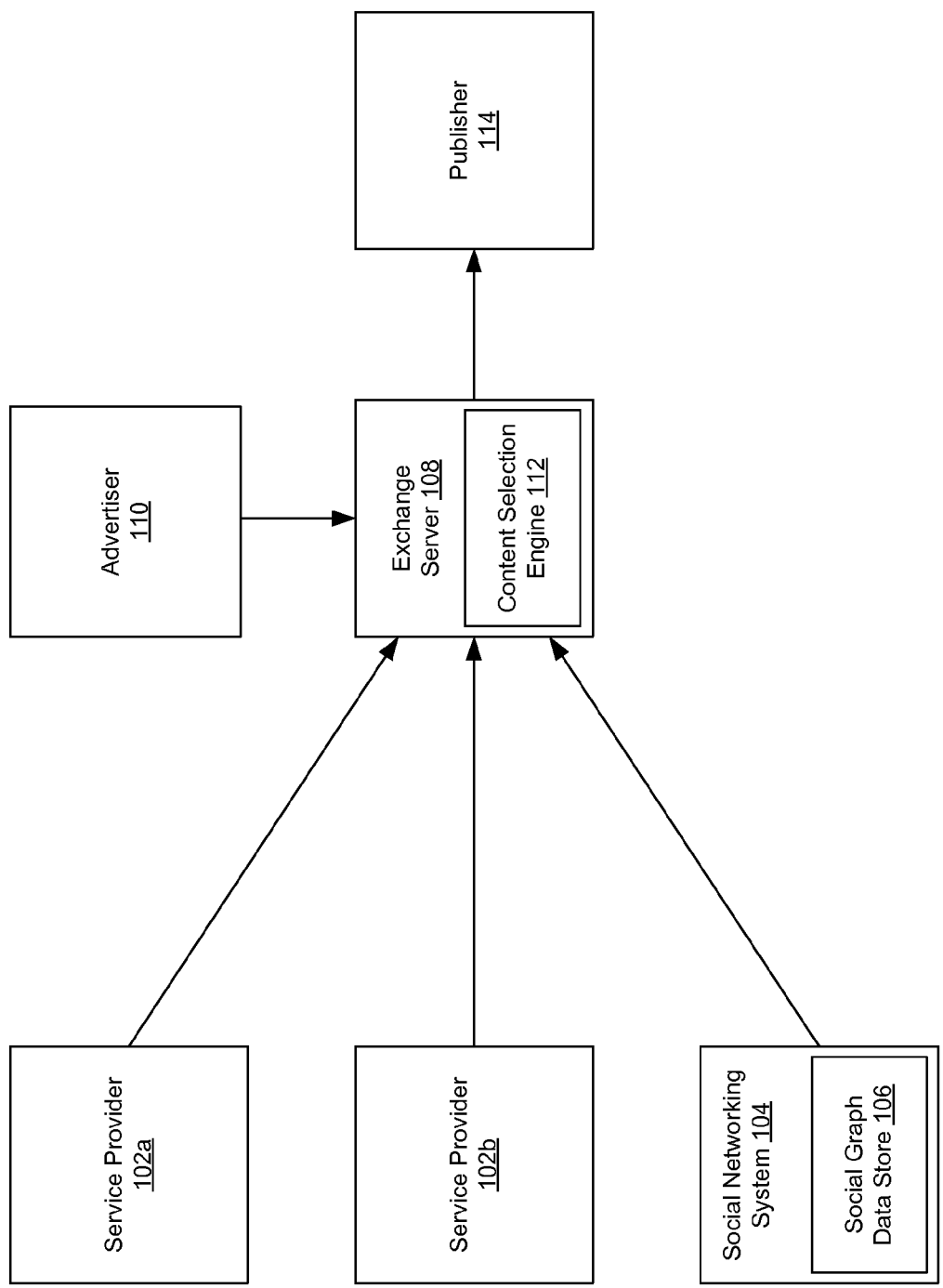
FIG. 1 is a diagram of a system for targeting content items to a user based on data from two or more service providers, in accordance with an embodiment of the invention.

FIG. 1 illustrates a system for targeting content items to a user based on data from two or more service providers, in accordance with an embodiment of the invention. In one embodiment, one or more service providers 102 and a social networking system 104 including a social graph data store 106, send user data to an exchange server 108, wherein the exchange server 108 aggregates data for each user. Additionally, the exchange server 108 receives advertising criteria for one or more advertisements from an advertiser 110. A content selection engine 112 selects an advertisement to display to a user based at least in part on the targeting criteria provided by the advertiser 110 and the aggregated user data. The exchange server 108 sends the selected content item to publisher 114.

A service provider 102 includes any entity that provides data or a service to a user over a network, including but not limited to social networking systems, web retailers, news providers, video content item providers, etc. FIG. 1 illustrates two service providers, 102a and 102b for illustration purposes only, the embodiments disclosed herein may include fewer or more service providers 102. In one embodiment, at least one of the service providers 102 is a social networking system 104. A social networking system 104 provides mechanisms allowing users to interact within and outside of their social networks. The social networking system 104 is discussed in greater detail below.

Users of the service providers 102 and the social networking system 104 may be an individual or any other entity, such as a business or another non-person entity. Service providers 102 and social networking system 104 may identify each user by assigning a unique user identification (ID) to each user or by identifying a user by an e-mail address. In one embodiment, the service providers 102 and the social networking system 104 send their users' data to an exchange server 106. To protect users' privacy, however, the service providers 102 and the social networking system 104 may not disclose a user's ID or e-mail address to the exchange server 108. Thus, in one embodiment, the exchange server 108 assigns an exchange ID to each unique user so that a unique user associated with two different service providers 102 may be identified by a common exchange ID.

The data provided by the service providers 102 and the social networking system 104 may include any information associated with a user. For example, the data may include but is not limited to a user's declared profile information, browsing history, purchasing history, content item viewing history, and social networking system information. Social networking system information that is tracked and maintained by a social networking system may be stored as a social graph within a social graph data store 106. The social graph includes a plurality of nodes that are interconnected by a plurality of edges (representing interactions, connections, communications or other measures of relatedness between nodes). A social graph node may represent a social networking system object that can act on and/or be acted upon by another node. An edge between nodes in a social graph represents any kind of connection or interaction between the two nodes, which may result from an action that was performed by one of the nodes on the other node. In this description, reference to an edge connecting two objects in a social graph is intended to refer to an edge connecting the nodes representing each of the two objects. In one embodiment, the social networking system 104 provides social graph data associated with a user to the exchange server 108.

The exchange server 108 receives user data from one or more service providers 102 and aggregates the user data for each unique user. The exchange server 108 may be a service provider, a social networking system, or another entity. In one embodiment, the exchange server 108 receives a social graph associated with a user from the social networking system 104. In such an instance, the exchange server 108 aggregates user data by generating an imputed social graph, wherein user data provided by the service providers 102 is added as nodes or edges to the social graph. For example, if a service provider 102 sends user data indicating that a user has purchased running shoes within the last month, the exchange server 108 adds running shoes as a node within the social graph and purchase activity as a edge connected the user with the running shoes node. As such, the exchange server 108 may generate a detailed imputed social graph for users of the social networking system 104 and the service providers 102. In one embodiment, the exchange sever 108 receives content item to provide to users based on the imputed social graph.

An advertiser 110 is an entity that provides content item to display to users. The content item may include but is not limited to social networking system content item, news, images, videos or advertisements. In one embodiment, the advertiser 110 provides advertisements with targeting criteria to the exchange server 108. Targeting criteria may include characteristics of a user to target advertisements. For example, targeting criteria may provide that a viewing user should thirty years old, with a university degree, who has viewed a news article published in the sports section of a newspaper. In other instances, targeting criteria include characteristics that may be tracked or provided by a service provider 102 or a social networking system 104.

The exchange server 108 receives targeting criteria associated with content item from the advertiser 110. In one embodiment, the content selection engine 112 selects content items to display to a user based at least in part on the targeting criteria provided by the advertiser 110 and the imputed social graph. For each viewing user, the content selection engine 112 may select a content item wherein the user's imputed social graph meets the content item's targeting criteria. In other embodiments, the exchange server 108 may select a content item based on other metrics, including but not limited to, the expected revenue from displaying the content item to the user, the click-through rate (CTR), the likelihood that a user will visit a web page associated with the displayed content item, and the likelihood that a user will purchase an item shown in the displayed content item. In another embodiment, the exchange server 108 may receive bids from advertisers to select a particular advertisement to display to users. For example, if two or more advertisements' targeting criteria match a user, the exchange server 108 may allow advertisers to place bids for displaying the advertisement to a user. In such an instance, the exchange server 108 receives bids and selects the matching advertisement that has the highest bid associated with displaying the advertisement to the user.

A publisher 114 is an entity that displays a content item to a user. The publisher 114 may include, for example, a service provider 102 such as a newspaper, a video content provider, a web retailer, an email service provider, or a social networking system. In one embodiment, the publisher 114 receives a content item selected by the content selection engine 112 and provided by the exchange server 108. The publisher 114 displays the received content item to the user.

Figure 2:
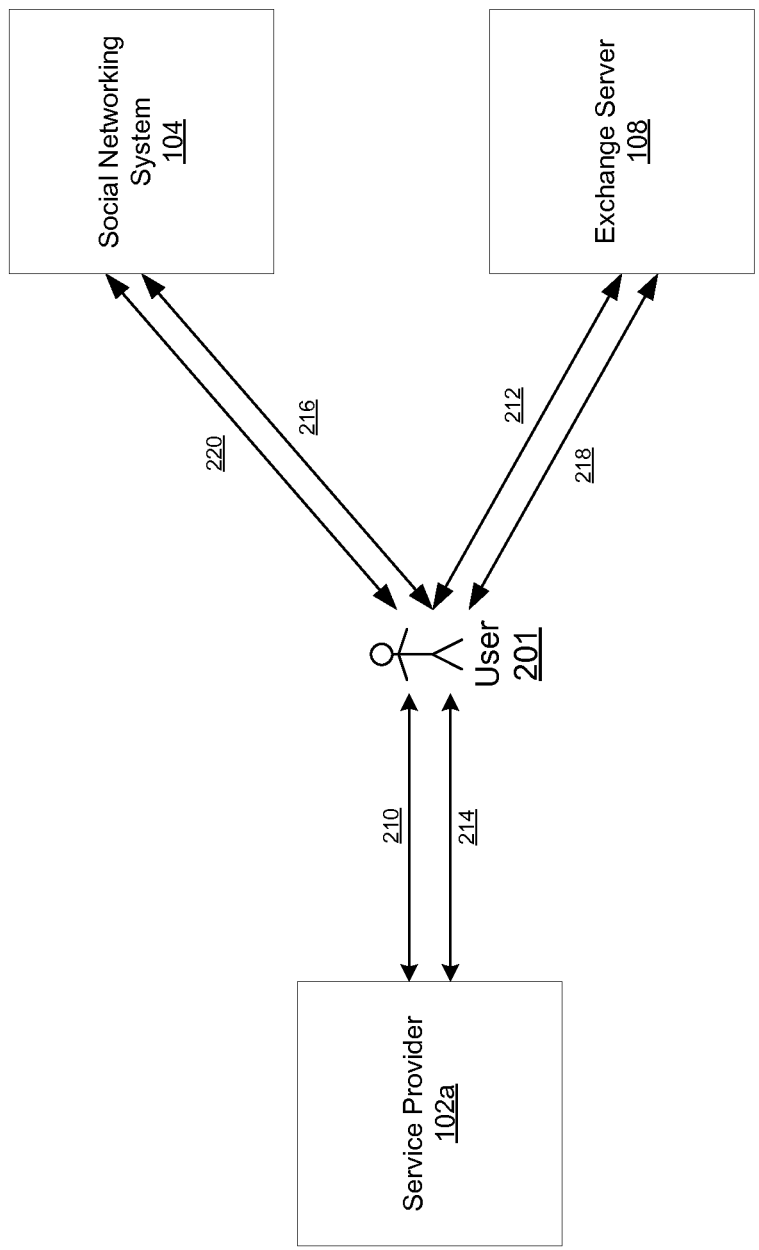
FIG. 2 is a diagram of a process for establishing an exchange ID for a user, in accordance with an embodiment of the invention.

FIG. 2 illustrates one embodiment for assigning an exchange ID to a user associated with a service provider 102 and a social networking system 104. FIG. 2 includes a user 201, a service provider 102a, a social networking system 104 and an exchange server 108. The communication steps between the user 201 and the several entities are illustrated as arrows for purposes of illustration.

In one embodiment, a user 201 accesses a content item provided by a service provider 102a. The user 201 may access the content item on web browser or an application executing on a computer, a mobile computing device, a mobile phone, or any other appropriate communication device. When the user 201 accesses 210 a content item provided by the service provider 102a, the service provider 102a provides 210 an uncachable pixel to the user. The uncachable pixel directs the user's computing device to access the exchange server 108 and includes the user's 201 encrypted service provider ID. The user 201 accesses 212 the exchange server 108 and provides the uncachable pixel to the exchange server. The exchange server 108 generates an exchange ID for the user based on the encrypted service provider ID provided by the user 201. The exchange server 108 sends 212 the exchange ID, a cookie set, and a uniform resource locator (URL) to the user 201. In one instance, the cookie set may be stored on the user's computing device. The URL provides a link to access 214 the service provider 102a and therefore provide 214 the exchange ID to the service provider 102a.

Thereinafter, if the user accesses 216 the social networking system 104, the user is provided 216 with an uncachable pixel by the social networking system. The uncachable pixel includes an encrypted social networking system ID and directs the user's computing device to access the exchange server 108. The user sends 218 the uncachable pixel and cookie set to the exchange server 108. The exchange server identifies the cookie set and associates the user's encrypted social networking system ID to the exchange ID already assigned to the user 201. The exchange server 108 sends 218 the exchange ID and a URL back to the user 201. The URL provides a link to access 220 the social networking system and provides the exchange ID to the social networking system 104, which associates the exchange ID to the social networking system ID or account. As such, an exchange ID for a unique user may be established across several service providers, including a social networking system. Additionally, the service providers and the social networking systems would not have to share any information that may identify the user, including the user's service provider ID or the user's email address.

Figure 3:
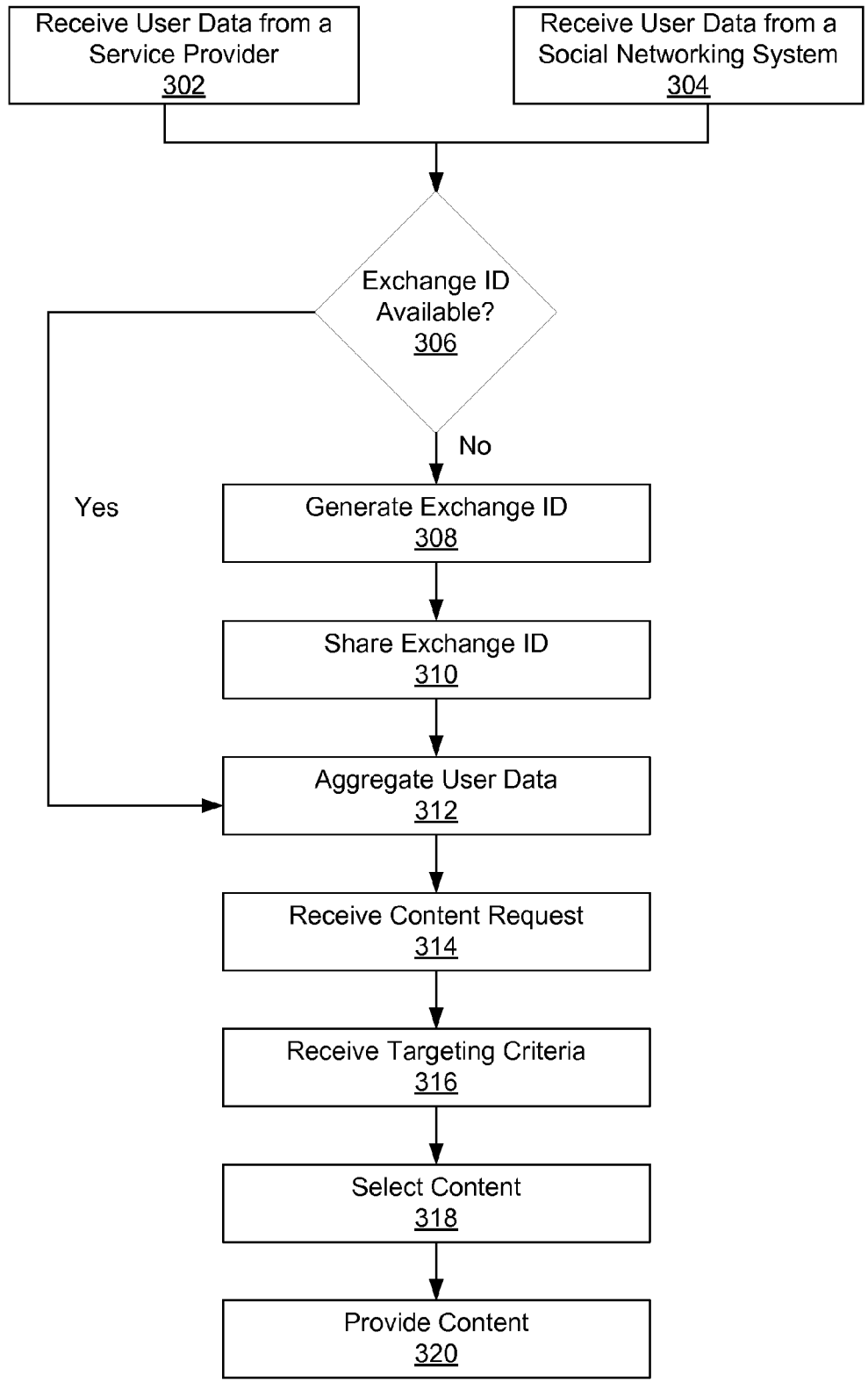
FIG. 3 is a flowchart of a process for targeting content items to a user based on data from two or more service providers, in accordance with an embodiment of the invention.

FIG. 3 illustrates a process for aggregating user data and providing content item to a user. In one embodiment, an exchange server 108 receives 302 user data from a service provider 102. As described in the specification, the service provider 102 may be any entity that monitors or stores some data about a user, including web retailers, news providers, video content item providers, etc. The data can be sent to the exchange server 108 via a network connection. In one embodiment, the exchange server receives 302 an encrypted user ID associated with each user's data. The encrypted user ID prevents the exchange server 302 or others from identifying a user by an email address or a service provider ID. The encrypted user ID, however, may allow an exchange server to identify that user data is about a same user over a course of several transactions.

The exchange server 108 may also receive 304 user data from a social networking system 104. The user data may include an encrypted user ID associated with the user of the social networking system. The encrypted user ID prevents the exchange server 302 and others from identifying a social networking system user. Additionally, the encrypted user ID may be persistent to allow the exchange server to associate a user's data with the same user over a course of several transactions. In one embodiment, the exchange server receives 304 a user's social graph from the social networking system. The user's social graph may include information about the user and other social networking system objects.

In one embodiment, the exchange server determines 306 if an exchange ID identifying the user is available. An exchange ID identifies the user based on the user's encrypted social networking system ID or an encrypted service provider ID. In one embodiment, the exchange server stores the user's exchange ID and associated service provider IDs and social networking system IDs in a table. In such an instance, the exchange server performs a lookup operation within the table to determine 306 if an exchange ID for the user is available based on the encrypted ID received from a social networking system or a service provider. If the exchange ID for the user is available, the process aggregates 312 user data as described in the specification.

If an exchange ID is not available for the user, the exchange provider generates 308 an exchange ID for the user. For example, each unique user may be assigned a unique exchange ID. The system for establishing a user ID for a new user is described in reference to FIG. 2. In one embodiment, the exchange server shares 310 the exchange ID for the user with the service providers and the social networking system, such that the service providers and the social networking system may subsequently use the exchange ID to provide to provide user data.

In one embodiment, the exchange server aggregates 312 user data from two or more sources. For example, the exchange server may aggregate 312 a user's data provided by a service provider and a social networking system. Aggregating 312 user data may include associating data received from a service provider with data received from a social networking system for each user or each exchange ID. In one embodiment, aggregating 312 user data comprises adding nodes and edges to a social graph provided by a social networking system. A book purchased from a service provider may be added as a node within a social graph, for example. Additionally, the action of purchasing a book may represent an edge connecting the user and the book within the social graph. Similarly, data from service providers such as news articles viewed by a user, videos or images viewed by a user may be aggregated 312 as nodes to a social graph.

In one embodiment, the exchange server receives 314 a content item request from a publisher. As described in the specification, the requested content item may include an advertisement, a status message update, a news story, an application or any other information that may be of interest to a user. The content item may be displayed on a publisher's web page or an application associated with or provided by a publisher. In one embodiment, the exchange server may receive 314 a listing of possible content items that may be displayed to a user by a publisher. As described in the specification, content items include advertisements, social networking system content items, such as wall messages, profile updates, status messages, game applications, etc.

In one embodiment, each content item may include targeting criteria that provide characteristics of a user who can be provided with the content item. In such an instance, the exchange server receives 316 targeting criteria associated with each content item. The targeting criteria may be provided by a publisher or any other entity. In one instance, wherein the content item is an advertisement, the targeting criteria may be provided by an advertiser. A publisher or an advertiser may provide targeting criteria to an exchange server to identify content items that may be targeted to the user according to targeting criteria associated with the content items. For example, if a content item's targeting criteria specifies that the content item should be displayed to a user who is interested in running, has joined a running group, and has purchased a book about running, the advertiser or publisher may not be able to display the content item to a user visiting a publisher's web page because the advertiser or the publisher may not know whether the user meets the targeting criteria. In such an instance, the exchange server may be able to identify a user who matches the content item's targeting criteria based on targeting criteria provided by the publisher and the aggregated data about users.

In one embodiment, the exchange server selects 318 a content item to display to a user based on the aggregated 312 data compiled for the user. As provided in the specification, the content item may include an advertisement, social networking system content item, news articles, photos or videos, etc. In one embodiment, the exchange server selects 318 content items that a user is most likely to view. For example, if a user is on a news publisher's web page, the exchange server may select 318 a news article that a user may also be interested in, based on the user's social networking system viewing history, purchase history from a retailer, or article viewing history from a variety of publishers. In another embodiment, the exchange server selects 318 a content item to display to a user based on the aggregated data for the user, the targeting criteria provided by the content item, and a measure of revenue expected to be produced from displaying the content item to the user. The revenue expected from displaying the content item to the user may be determined by the user's click through rate (CTR) for content items, the likelihood that a user is interested in the content item or a product displayed within the content item, and a bid price provided by the advertiser or another entity to display the content item to the user. The bid price may include that price an advertiser has provided for displaying the content item and a price if the user clicks on the content item. Other metrics for determining the expected revenue generated by the content items may be used in other embodiments, for example, an advertiser may provide additional fees or revenue if the user visit's an advertiser's or a content provider's web page or downloads and uses an application associated with the content item and purchases a product from an advertiser or another retailer selling the product displayed in the content item.

In one embodiment, the exchange server selects 318 a content item based on a bid auction format. As described in the specification, the exchange server 108 applies targeting criteria to identify candidate content items that can be shown to a user. For each candidate content item, the exchange server 108 predicts the likelihood that the user will select the content item based on aggregated information about the user and calculates a bid associated with the content item. The exchange server 108 computes an expected value of showing each content item to the user by combining the likelihood of selection and the bid. The content item with the highest combined value may be displayed to the user. The exchange server provides 320 the selected content item to the publisher. For example, if the exchange server selects 320 a social networking system content item to display to the user, the content item is provided to the publisher so the publisher can display it to the user. Similarly, exchange server may also provide advertisements to display to a user on a publisher's web page or application. As described in the specification above, the advertisement is selected based on the user's aggregated data, the advertisement's targeting criteria and a revenue expected to be generated from displaying the advertisement to the user. Wherein the publisher provides a listing of content items available to the publisher, the exchange server provides 320 the content item selected from among the provided content items.

As such, a publisher may advantageously display content items to a user that a user is likely interested in. For example, a publisher may know very limited information about a user visiting the publisher's web page or the publisher's application. Thus, a publisher is unable to effectively target content item and advertisements to the user based on the user's interests and characteristics. The exchange server aggregates a user's information from several sources, including a social networking system, publishers, retailers, content item providers, etc. In one embodiment, the exchange server aggregates data from several sources by adding nodes and edges to a social graph provided by a social networking system. An aggregated social graph may be used to target content item to a user. For example, content item, including advertisement may provide targeting criteria specifying characteristics of a user. The exchange server matches advertisements to users based on whether users' characteristics as provided by the aggregated social graph match the advertisements' targeting criteria. Additionally, the exchange server selects one or more advertisements to display to the user based on expected revenue to be generated from displaying the advertisement to the user. Thus, a publisher may advantageously display advertisements to user that are directed to the user and maximize the revenue expected to be generated from the displaying the advertisement to the user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving first user data from a first service provider, the first user data comprising a user identity of each of a plurality of users of the first service provider;
   receiving second user data from a second service provider, the second user data comprising a user identity of each of a plurality of users of the second service provider;
   matching users of the first service provider and the second service provider using the identities;
   combining the first user data and the second user data to create an aggregated user profile for one or more users of the first service provider and the second service provider that have a matching user identity;
   selecting a content item for the viewing user based on the aggregated user profile of the viewing user; and
   sending the selected content item for display to the viewing user.

2. The method of claim 1, wherein the first service provider is a social networking system.

3. The method of claim 1, wherein the second service provider is selected from a group consisting of a web publisher, an image content provider, a video content provider, and a news publisher.

4. The method of claim 1, wherein the second user data is selected from a group consisting of the user's purchasing history, web browsing history, image viewing history, video content item viewing history, news content item viewing history, click through rate, and service provider data.

5. The method of claim 1, further comprising:
   establishing an exchange identifier for a user responsive to receiving an encrypted user identity provided by the first service provider or the second service provider.

6. The method of claim 1, wherein first user data received from the first service provider comprises a social graph including nodes and edges, wherein a node represents an object and an edge represents a connection between objects.

7. The method of claim 6, wherein combining user data comprises generating an imputed graph by adding user data received from the second service provider as nodes and edges within the social graph.

8. The method of claim 1, wherein the content item is selected from a group consisting of an advertisement, a news story, a video, an image, and a newsfeed story.

9. The method of claim 1, further comprising:
   matching one or more content items to the viewing user based on targeting criteria for the content items.

10. The method of claim 1, wherein the selected content item is selected based on an expected revenue generated from displaying the content item to the viewing user.

11. The method of claim 1, wherein the sending comprises sending the selected content item to a publisher for display to the viewing user.

12. The method of claim 1, further comprising:
    receiving user information responsive to a tracking pixel redirecting the user from a second service provider, the tracking pixel providing user information; and
    generating an exchange identification for the user if the user information does not match existing user information.

13. The method of claim 1, wherein selecting a content item for the viewing user comprises ranking multiple items using user data.

14. The method of claim 1, wherein the targeting criteria applies to at least some user data in the aggregate user profile received from the second service provider and to at least some user data in the aggregate user profile received from the first service provider.

15. The method of claim 1, wherein the targeting criteria is based on connections in the first service provider.

16. The method of claim 1, wherein the user identity is encrypted.

17. A computer program product comprising a non-transitory computer-readable storage medium containing computer program code that when executed by a processor causes the processor to:
    receive first user data from a first service provider, the first user data comprising a user identity of each of a plurality of users of the first service provider;
    receive second user data from a second service provider, the second user data comprising a user identity of each of a plurality of users of the second service provider;
    match users of the first service provider and the second service provider using the identities;
    combine the first user data and the second user data to create an aggregated user profile for one or more users of the first service provider and the second service provider that have a matching user identity;
    select the content item for the viewing user based the aggregated user profile of the viewing user; and
    send the selected content item for display to the viewing user.

18. The computer program product of claim 17, wherein the first service provider is a social networking system.

19. The computer program product of claim 17, wherein selecting a content item for the viewing user comprises ranking multiple items using user data.

20. The computer program product of claim 17, wherein the second service provider is selected from a group consisting of a web publisher, an image content provider, a video content provider, and a news publisher.

21. The computer program product of claim 17 wherein the second user data is selected from a group consisting of the user's purchasing history, web browsing history, image viewing history, video content item viewing history, news content item viewing history, click through rate, and service provider data.

22. The computer program product of claim 17 wherein the content item is selected from a group consisting of an advertisement, a news story, a video, an image, and a newsfeed story.

* * * * *

UNITED STATES PATENT AND TRADEMARK OFFICE
CERTIFICATE OF CORRECTION

PATENT NO. : 9,129,311 B2
APPLICATION NO. : 14/569565
DATED : September 8, 2015
INVENTOR(S) : Kent Schoen et al.

Page 1 of 1

It is certified that error appears in the above-identified patent and that said Letters Patent is hereby corrected as shown below:

In the Claims:
Column 10, line 41, claim 17, replace "select the content item for the viewing user based the," with
-- select the content item for the viewing user based on the --.

Signed and Sealed this
Sixteenth Day of August, 2016

Michelle K. Lee
*Director of the United States Patent and Trademark Office*